June 8, 1943. E. M. GREEN 2,321,378
COMBINATION SCREW AND RIVET
Filed Feb. 3, 1942
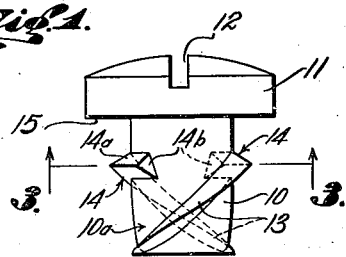
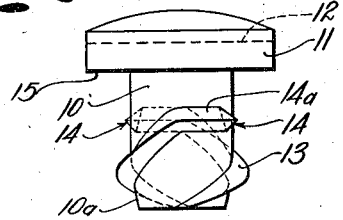
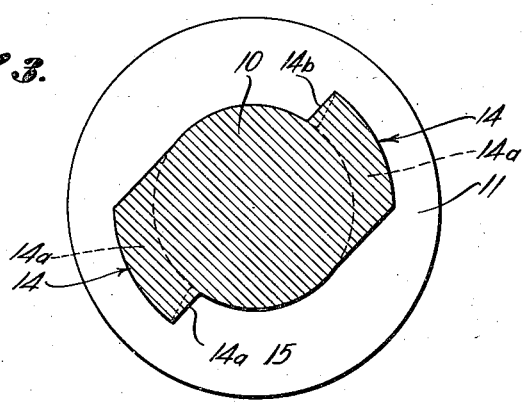
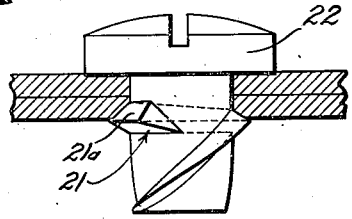
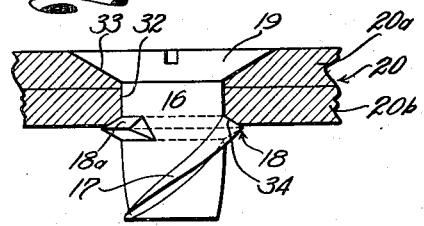
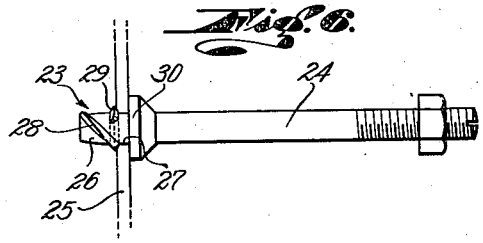
Inventor
EMMET M. GREEN
H Calvin White
Attorney Patented June 8, 1943

2,321,378

UNITED STATES PATENT OFFICE 2,321,378

COMBINATION SCREW AND RIVET

Emmet M. Green, Los Angeles, Calif.

Application February 3, 1942, Serial No. 429,379

6 Claims. (Cl. 85—46)

This invention has to do generally with improvements in fasteners adaptable for various purposes such as securing together sections or layers of material, or for attaching to a support a member to be mounted or fastened thereto. Particularly the invention is useful for permanently fastening together work sections, or for making permanent attachments to work, accessible from only one side or surface, as to serve purposes where so-called "blind" riveting has been employed.

One of my primary objects is to provide a novel form of fastener having characteristics of both a screw and a rivet, in that by simple screw motion, the fastener may be fully driven or seated in the work, and thereafter prevented, by reason of its rivet characteristics, from becoming withdrawn from the work. It is also contemplated that in functioning as a screw, the fastener may have a self-threading action, whereby it may be turned into and secured within an unthreaded opening in the work.

Although capable of various specific forms, the present fastener may consist generally of an upset or headed stem carrying one or more screw threads or flights permitting the stem to be turned and advanced through the work opening, and a back-out arresting projection or shoulder carried by the stem into or through the work opening to a position of engagement against an inner surface of the work to prevent withdrawal of the stem by its reverse turning. As will appear, the back-out arresting shoulder may be formed as a continuation of the thread, but at little or no pitch, so that such continuation therefore becomes a bearing shoulder or abutment, as distinguished from a screw thread. Preferably, the shoulder is located with predetermined relation to the head of the stem, so that the shoulder is carried through the work to a position (when the head is engaged against the work) in which the work is tightly confined between the shoulder and the opposed surface of the head.

While these as well as various additional features and objects of the invention might preliminarily be mentioned and discussed, all aspects of the invention can be explained and understood to better advantage by reference to certain typical and illustrative forms, described in detail in the following. Throughout the description, reference is had to the accompanying drawing, in which:

Fig. 1 illustrates a preferred embodiment of the invention in a multiple-thread fastener;

Fig. 2 is a similar view showing the fastener turned 90°;

Fig. 3 is an enlarged cross-section on line 3—3 of Fig. 1;

Fig. 4 illustrates a modification having an angular back-out arresting shoulder;

Fig. 5 shows a form of the invention having a single screw thread; and

Fig. 6 shows a further variation of the invention illustrating the adaptability of the fastener to serve purposes other than or in addition to securing together parts of the work.

In the description of the various forms of the invention, the term "work" is to be understood to include any member, or combination of members, through an opening in which the fastener is to be inserted and permanently secured. As will appear, in certain instances the particular purpose of the fastener may be to secure together sections or layers of the work, as in instances and for purposes where rivets commonly are used, or the fastener may serve as an attachment or anchorage for securing to work serving essentially as a support, some element such as a bolt, bracket, or the like, to which the fastener is attached or formed integral therewith. Further, because of the capacity of the fastener for resisting removal from the work, one side of which may be inaccessible, I may designate for convenience of description, certain surfaces of the work engaged by the head and back-out arresting shoulder of the fastener as "outer" and "inner" surfaces, respectively. Also it is to be understood that such surfaces may be spaced apart according to the extreme dimension (e. g., full thickness) of that part of the work through which the fastener passes, or that one or both surfaces may be located within the work. Finally, the term "head" is understood to include stem enlargements such as the slotted tool-receiving heads in Figs. 1 to 5, or other forms of enlargements provided primarily, as in Fig. 6, for bearing engagement against the outer surface of the work.

In the preferred form of the invention shown in Fig. 1, the stem 10 has an enlarged head 11 containing a driver slot 12, and carries multiple individual threads 13 of suitable form and arrangement capable of causing advancement of the stem, by its rotation through the work opening to the point of bringing shoulders 14 into back-out arresting position, as will presently appear. Preferably, I employ a multiple arrangement of equally spaced threads 13, two being shown as typical although a greater number may be provided, in order to better stabilize or maintain the stem in axial alinement with the work opening throughout rotational advancement of the stem. Typically, the threads 13 are shown to have considerable pitch and to extend substantially 180° about the inner or tapered portion 10a of the stem. These threads also may be of V-form tapered toward the end of the stem, adapted by their shape characteristics and angularities to be self-threading within an unthreaded opening in the work. Accordingly, it is desirable ordinarily to form the fastener of material that is considerably harder than the work material into which the stem is to be threaded. As illustrative, for attachment to or securing together work formed of aluminum or relatively soft aluminum alloys, the stem and threads of the fastener may be made of such materials as steel, relatively hard alloys, or a normally soft aluminum or aluminum alloy, the surface of which has been suitably hardened as by the commonly used anodizing processes.

The back-out arresting projections 14 preferably are formed as arcuate shoulders positioned on the stem 10 in predetermined spaced relation to the work-engaging shoulder 15 of the head 11. In any instance, the particular spacing of shoulders 14 and 15 may be determined in accordance with such consideration as the thickness of the work, the tightness with which the work is to be confined between the shoulders, and the extent to which it may be desired to cause, by the action of the threads 13 and shoulders 14, the work surface engaged by the latter to be formed within the work. As best illustrated in Fig. 2, shoulders 14 desirably are formed as continuations of the threads 13, each extending at substantially zero pitch an arcuate distance sufficient to provide substantial bearing engagement with the work. Shoulders 14 also may be V-shaped in cross-section, or substantially so, having upper or inner bearing surfaces 14a inclined outwardly and away from the head 11. The ends 14b of shoulders 14 may be beveled or sloped inwardly, relatively steeply or abruptly, as viewed in Fig. 1, to prevent, as will later appear, any tendency of the shoulders upon left-hand rotation of the stem to reenter the grooves formed by the shoulders in being turned through the work.

The form of the invention shown in Fig. 5 is essentially similar to that of Figs. 1 and 2, except that the stem 16 carries a single thread 17 merging at its inner end into the back-out arresting shoulder 18, which in this instance is shown to have an arcuate extent somewhat in excess of 180°. The arcuate extent of the shoulder is not critical and is subject to variation. Ordinarily, it is desired that the shoulder, or portions thereof as in Fig. 3, be positioned at diametrically opposite sides of the stem, to balance and stabilize the engagement of the shoulder against the work. In Fig. 5, the head 19 is shown to be countersunk within the work 20.

Fig. 4 illustrates a further variant form generally similar to Fig. 5, except that the inner surface 21a of the back-out arresting shoulder 21 is given a relatively slight pitch so that as the shoulder is turned into its final or fully engaged position, surface 21a will have a wedging engagement with the work, tending to tighten its confinement between shoulder 21 and the head 22.

Fig. 6 is illustrative of uses of described forms of fasteners to secure to the work, or a suitable support, a bolt, bracket, or the like used to mount objects on the support. Typically, the fastener 23 is shown to be formed integrally with a bolt 24 to be mounted, for example, on a sheet metal support 25. By rotation of stem 26 in the work opening 27, the screw thread 28 advances the stem and shoulder 29 through the opening to the point of engaging the bolt enlargement or head 30 with the outer surface of the work, and tightly confining the work between shoulder 29 and the head 30.

The action of the fastener in being secured within the work may be described with reference to Fig. 5, assuming the fastener to be used to secure together layers or sheet sections 20a and 20b of the work 20. Initially the work will have been drilled to form an opening 32 extending straight through section 20b, and reamed out at 33 in section 20a if a countersunk head is to be used. By right-hand turning of the fastener into the unthreaded work opening from the side of section 20a, the screw flight 17 threads itself into the work and continues to axially advance the stem through the work opening until the thread has passed through the work and the head 19 has seated. The thread serves also to turn shoulder 18 into and through the work, the shoulder cutting in the work a spiral groove from which it emerges and turns into tight engagement with the inner surface 34 of the work about opening 32. As the shoulder turns out of the groove which it cuts in the work, the inclined or angular shoulder surface (18a or 14a) may tend to wedge against the work and cause the surface 34 to conform in shape to the engaging shoulder surface.

Thread 17 having left the work opening, the thread of course is ineffective to cause withdrawal or backing-out movement of the stem upon reverse or left-hand rotation. The back-out arresting shoulder, having moved out of the groove which it formed in the work during advancement through the opening, also is ineffective to cause withdrawal of the stem on reverse rotation, this being particularly true since the end of the shoulder is shaped, as mentioned above, to obviate any tendency to reenter the groove. Accordingly, when the fastener is fully seated in the work, the function of shoulder 18 becomes essentially that of an expanded stem end of a rivet, namely, to prevent withdrawal of the fastener from its opening, at least by a manipulation at the outer surface of the work, and to snugly or tightly confine the work between the shoulder and the head of the stem.

Due to the variance in angularity between the back-out arresting shoulder and the stem thread, the shoulder of course tends to deform the thread-cut mating groove or thread in the work. Because of possible confusion, no attempt has been made to show the thread and shoulder cut grooves in the work opening.

I claim:

1. A fastener of the character described adapted to be permanently secured within an opening in the work, comprising a stem carrying a V-thread permitting self-tapping rotational advancement of the stem through said opening from an outer surface of the work, and an arcuate shoulder on the stem engageable with an inner surface of the work to prevent reverse rotation of the stem out of said opening, said shoulder being formed on the stem as a continuation of said V-thread with substantially the same cross-sectional size and shape and extending at substantially zero pitch.

2. A fastener of the character described adapted to be permanently secured within an opening in the work, comprising a headed stem carrying a V-thread permitting rotational advancement of the stem through said opening from an outer surface of the work, and an arcuate shoulder on the stem spaced from the head of the fastener and engageable with an inner surface of the work to prevent reverse rotation of the stem out of said opening, said shoulder being formed on said stem as a continuation of said V-thread at substantially zero pitch and the end of said shoulder having a bevel sloping away from said head.

3. A fastener of the character described comprising a screw having a head and a threaded stem, the thread on said stem terminating with an arcuate shoulder extending part way around the stem in spaced relation to said head and at substantially zero pitch, the end of said shoulder having on the side toward said head a bevel sloping away from said head.

4. A fastener of the character described adapted to be permanently secured in an opening of the work, comprising a stem having a self-tapping V-thread permitting rotational advancement of the stem in said opening from an outer surface of the work, a head on the stem engageable with said outer surface when the stem is fully turned into said opening, and an arcuate shoulder on the stem engageable with an inner surface of the work to prevent reverse rotation of the stem out of said opening, said shoulder being formed as a continuation of said thread curving therefrom to substantially zero pitch and having substantially the same cross-sectional size and shape.

5. A fastener of the character described adapted to be permanently secured in a work opening, comprising a stem having a head, a pair of screw threads on the stem and spaced from said head, and a pair of shoulders formed on said stem as continuations of the threads curving therefrom to substantially zero pitch and extending arcuately of the stem in spaced relation to said head, the ends of said shoulders being beveled on the sides toward said head so as to slope away from said head to prevent reentry of the threads in the work opening.

6. A fastener of the character described adapted to be permanently secured in a work opening; comprising a stem having a head, a pair of screw threads on the stem and spaced from said head, and a pair of shoulders formed on said stem as continuations of the threads curving therefrom to substantially zero pitch and extending arcuately of the stem in spaced relation to said head, said shoulders having substantially the same cross-sectional size and shape as said threads.

EMMET M. GREEN.